(No Model.)
W. J. WALKER.
PIPE WRENCH.
No. 482,109. Patented Sept. 6, 1892.
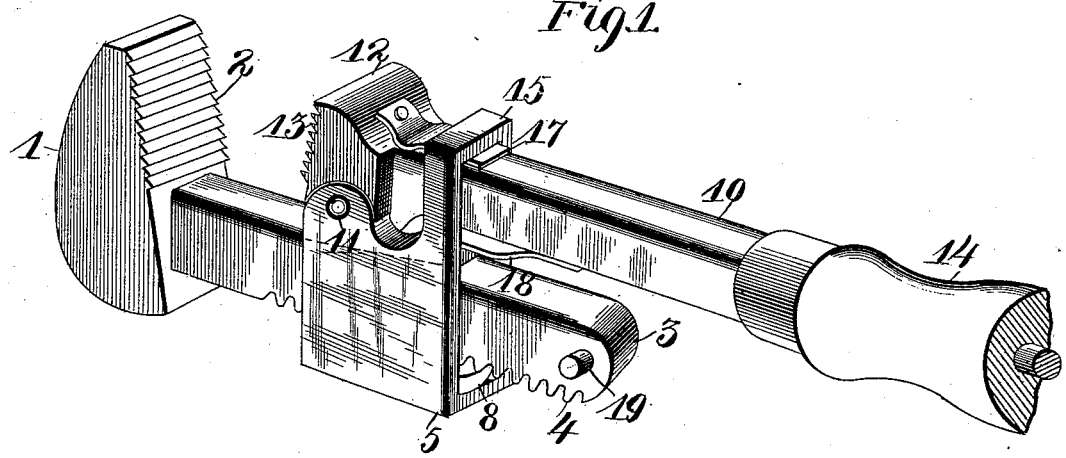
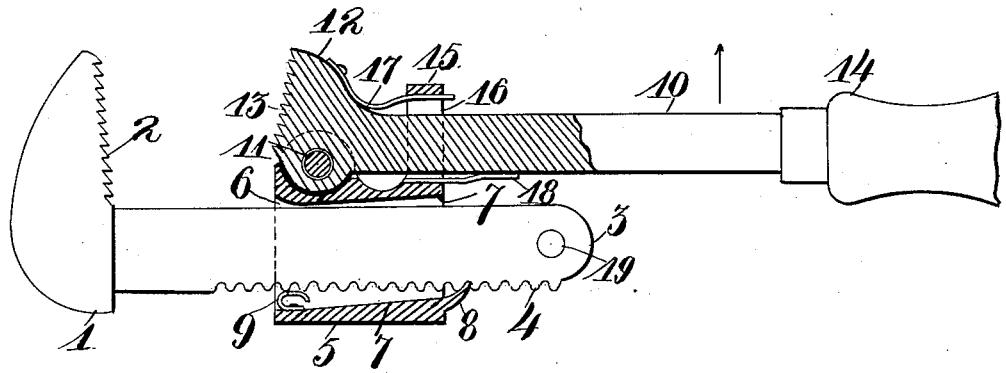
Witnesses
Inventor
Wm. J. Walker.
By his Attorneys

UNITED STATES PATENT OFFICE.

WILLIAM J. WALKER, OF ST. LOUIS, MISSOURI.

PIPE-WRENCH.

SPECIFICATION forming part of Letters Patent No. 482,109, dated September 6, 1892.

Application filed July 8, 1892. Serial No. 439,341. (No model.)

*To all whom it may concern:*

Be it known that I, WILLIAM J. WALKER, of the city of St. Louis, State of Missouri, have invented certain new and useful Improvements in Pipe-Wrenches, of which the following is a full, clear, and exact description, reference being had to the accompanying drawings, forming a part hereof.

My invention relates to improvements in pipe-wrenches; and it consists in the novel arrangement and combination of parts, more particularly described in the specification and set out in the claims.

In the drawings, Figure 1 is a perspective view of my complete invention, and Fig. 2 is a combined side elevation and longitudinal section of the same.

The object of my invention is to construct a pipe-wrench that can be quickly and effectually adjusted to pipes of various sizes, dispensing with the ordinary nut and screw-threads generally employed in wrenches of this character to secure their adjustment.

Referring to the drawings, 1 represents the stationary jaw, the inner surface of which is provided with the usual teeth 2 to prevent slipping when the same is brought in contact with the pipe.

3 represents the horizontal extension, which is formed with or attached to the stationary jaw 1, the under side of which is provided with teeth 4 for the purposes hereinafter stated.

5 represents the movable member of the said wrench, which carries the remaining parts comprising my invention and is provided with a longitudinal passage 6 for the admission of the horizontal extension 3 of the stationary jaw, allowing the same to be moved independently of the said member. The upper and lower walls of the passage 6 are inclined in the same direction, as shown at 7, allowing the member 5 to be slightly tilted when the same is moved from a pipe, thereby releasing its engagement with the horizontal extension 3.

8 represents a tooth, which is formed with the member 5 at the bottom of the passage 6 and is located at the rear of said member, projecting a suitable distance therefrom. The end of the said tooth 8 is adapted to engage with the teeth 4 of the horizontal extension as clearly shown, thereby holding the movable member 5 in any position upon the extension 3.

9 represents a flat spring, one end of which is fixed to the inclined bottom 7 of the passage 6 opposite to the tooth 8 and the free end of said spring normally pressing against the surface of the teeth 4, the tendency of which is to cause the engaging end of the tooth 8 to normally rest between or engage with the teeth 4, and thus hold the movable member in a locked position against movement in one direction and allowing it to be moved or slid in the opposite direction or toward the stationary jaw 1.

10 represents a lever, one end of which is movably attached to the movable member 5 above the passage 6 formed therein by bolt or rivet 11, passing through the said member and lever, allowing the said lever to be operated independently of the remaining parts.

12 represents the enlarged end of said lever, which forms the second jaw of the wrench, the engaging surface of which is provided with teeth 13, which are adapted to be brought in contact with the pipe and grip the same when the lever is moved in the direction as shown by the arrow in Fig. 2. The opposite or free end of the lever 10 is provided with an ordinary handle 14 for easy manipulation and convenience in handling.

15 represents an extension, which is formed with the member 5 and is provided with a space 16, through which the lever 10 passes and is free to move therein for limiting the movement of the lever in one direction.

17 represents a flat spring, one end of which is attached to the upper curved surface of the enlarged portion of the lever 10 and the opposite or free end of the said spring passes through the opening 16 of the extension 15 and bears against the upper wall of the said extension. 18 represents a similar spring, one end of which is attached to the lower surface of the lever 10 and the opposite or free end of said spring also passes through the space 16 and bears against the bottom or lower wall of the same. The object of the springs 17 and 18 is to hold the lever 10 in a proper position for manipulation.

19 represents a pin, which is passed through one end of the extension 3 of the stationary jaw, the ends of which extend a suitable distance on either side of the said extension and prevent the stationary jaw from passing out of the movable member 5.

In applying the wrench to a pipe the stationary jaw 1 is first placed in position against the same, after which the movable member 5 is adjusted in proximity to the pipe, bringing the teeth 13, formed on the enlarged portion of the lever 10, in contact with said pipe. While the wrench is in this position upon the pipe, the lever 10 is moved in the direction shown by the arrow in Fig. 2, causing the enlarged portion of the said lever 10, or more properly the teeth formed thereon, to come in contact and firmly grip the pipe to be turned. Of course to move the member 5 in the opposite direction or from the stationary jaw 1 the same is slightly tilted, causing the tooth 8 to be freed from its engaging position, and while in said position the said member can be easily moved. It will thus be readily seen that the arrangement of the various parts of the present invention facilitates the ready and easy adjustment of these parts while manipulating pipes of various sizes.

Having fully described my invention, what I claim is—

1. A pipe-wrench comprising a stationary jaw, an extension formed on the same, teeth formed on said extension, a movable member adapted to slide on said extension, a tooth formed rigidly with said member for engagement with said teeth, and a lever movably attached to said member, one end of which forms the movable jaw, substantially as described.

2. A pipe-wrench comprising a stationary jaw, an extension 3, formed on the same, teeth formed on the said extension, a movable member 5, having a space through which the said extension passes, inclined upper and lower surfaces 7, forming a part of said space, a tooth 8, formed on the said member and adapted to engage with said teeth, a lever 10, movably attached to said member, one end of which forms the movable jaw, and a spring 9 for holding the said tooth 8 in engagement with the teeth 4, formed on the extension 3, substantially as described.

3. A pipe-wrench consisting of a stationary jaw 1, a horizontal extension 3, forming a part of the same, teeth 4, formed on the lower surface of said extension, movable member 5, having a space 6, through which the said extension passes, a tooth 8, formed with the said member and adapted to engage with said teeth 4, a spring 9, located within the said passage 6 and interposed between the lower wall of the same and the lower surface of said extension, and a handle or lever 10, movably attached to said member 5, one end of which forms the movable jaw, substantially as described.

4. A pipe-wrench consisting of a stationary jaw 1, having a horizontal extension 3, teeth formed on the lower surface of the same, a movable member 5, having a passage 6, through which the said extension passes, inclined upper and lower surfaces 7, forming a part of said passage, a tooth 8, formed with the said member 5 and adapted to engage with the said teeth 4, a spring 9, interposed between the extension 3 and the lower wall of the passage 6, an extension 15, formed with the member 5 and provided with an opening 16, and a lever 10, movably attached to the said member, one end of which forms the movable jaw, substantially as described.

In testimony whereof I affix my signature in the presence of two witnesses.

WILLIAM J. WALKER.

Witnesses:
C. F. KELLER,
D. I. NEUDORF.